United States Patent [19]
Konno et al.

[11] Patent Number: 4,937,510
[45] Date of Patent: Jun. 26, 1990

[54] CONTROL APPARATUS FOR A LINEAR MOTOR FOR DRIVING A PICKUP

[75] Inventors: Yoshikiyo Konno; Takashi Suzuki, both of Saitama, Japan

[73] Assignee: Pioneer Electronic Corporation, Tokyo, Japan

[21] Appl. No.: 256,799

[22] Filed: Oct. 12, 1988

[30] Foreign Application Priority Data

Oct. 12, 1987 [JP] Japan .................................... 257014

[51] Int. Cl.⁵ ........................................... H02K 33/16
[52] U.S. Cl. .................... 318/562; 318/561; 318/594; 360/78.07
[58] Field of Search ................ 318/38, 135, 592–598, 318/561, 603, 615, 618, 608, 685, 687; 388/800–850; 360/73.01, 73.02, 73.07, 73.13, 77.01, 77.04, 77.06, 77.07, 78.01, 78.07, 78.08, 78.11, 78.05, 78.14, 77.16, 77.17, 75

[56] References Cited

U.S. PATENT DOCUMENTS

| | | | |
|---|---|---|---|
| 3,736,485 | 5/1973 | Scarrott et al. | 318/594 X |
| 4,006,394 | 2/1977 | Cuda et al. | 318/594 X |
| 4,030,132 | 6/1977 | Iftikar et al. | 318/617 X |
| 4,184,108 | 1/1980 | Sordello et al. | 318/594 X |
| 4,200,827 | 4/1980 | Oswald | 318/594 X |
| 4,463,300 | 7/1984 | Mayne et al. | 318/603 X |
| 4,480,217 | 10/1984 | Robbins et al. | 318/561 X |
| 4,575,776 | 3/1986 | Stephens et al. | 318/561 X |
| 4,636,883 | 1/1987 | Hashimoto | 360/78.07 |
| 4,724,370 | 2/1988 | Moraru et al. | 318/632 X |
| 4,748,607 | 5/1988 | Nakane | 369/32 |
| 4,808,901 | 2/1989 | Sakamoto | 318/687 |
| 4,827,200 | 5/1989 | Ogura et al. | 318/561 |

FOREIGN PATENT DOCUMENTS 1485563 9/1977 United Kingdom .
2020474 11/1979 United Kingdom .
2086093 5/1982 United Kingdom .

OTHER PUBLICATIONS

British Patent Office Search Report, Nov. 30, 1988, by Examiner M. J. Dixon.

Primary Examiner—William M. Shoop, Jr.
Assistant Examiner—Paul Ip
Attorney, Agent, or Firm—Sughrue, Mion, Zinn, Macpeak & Seas

[57] ABSTRACT

A control apparatus for a linear motor for driving a pickup of an information storage/readout apparatus with which the pickup can be moved more quickly and accurately to a desired target position. A slider for supporting the pickup is provided which is movable in a straight line. A magnetic circuit for forming a magnetic gap extends in the moving direction of the slider. A moving coil is mounted on the slider having at least a portion located within the magnetic gap. The voltage induced across the moving coil is detected to product a signal indicative of the velocity of the pickup. A velocity feedback loop feeds back the detected voltage to a driving source of the coil. The value of the feedback coefficient of the velocity feedback loop is set in accordance with the operating mode of the apparatus.

4 Claims, 6 Drawing Sheets

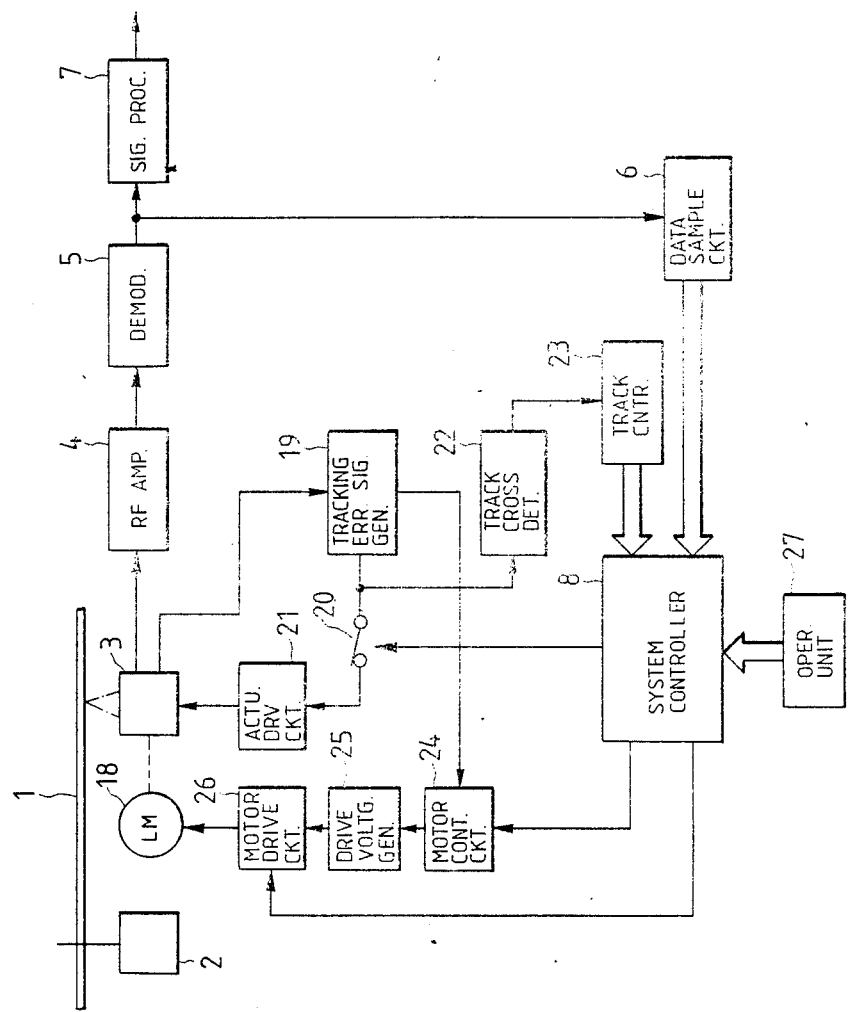

CONTROL APPARATUS FOR A LINEAR MOTOR FOR DRIVING A PICKUP

BACKGROUND OF THE INVENTION

The present invention relates to a control apparatus for a linear motor used for driving a pickup of an information storage/readout apparatus.

In information storage/readout apparatuses, a pickup for storing information into and for reading information from a disk-shaped storage medium (referred to simply as a disk hereafter) is supported by a slider which is mounted linearly movably in a radial direction of the disk. A driver is provided for the slider in the form of a rotary motor whose rotational driving force is transmitted to the slider by means of a reduction mechanism, for example, a combination of a rack and a pinion. However, a rotary motor has limited response characteristics, which imposes inherent limitations in a so-called high speed search operation in which the pickup is driven at a high speed to search for a desired recorded track.

Despite such technical difficulties, search operations of even higher speed are demanded, and a linear motor which exhibits good response characteristics has been employed recently as a driving source for the pickup to achieve higher speeds in search operations.

On the other hand, a linear motor is arranged in such a way that motion of a movable portion is braked only by mechanical frictional force between a guide rail and the movable portion moving along the guide rail. Thus, if the pickup is to be driven directly by the linear motor, it is difficult to position the pickup accurately on the desired track even though the pickup may be driven at a high speed. This problem requires solution.

SUMMARY OF THE INVENTION

The present invention was made to solve the aforementioned problems.

An object of the invention is thus to provide a control apparatus for a linear motor for driving a pickup, which motor can be controlled to position a pickup more quickly and accurately at a desired position on a disk.

In accordance with the above and other objects, the invention provides a control apparatus for a linear motor for driving a pickup in an information storage/readout apparatus, the control comprising:

detecting means for detecting a voltage induced across the moving coil of a linear motor for driving the pickup in accordance with the moving velocity of a pick-up coil;

a velocity feedback loop for feeding back the voltage detected by the detecting means to a driving source of the coil; and means for changing the value of feedback coefficient of the velocity feedback loop.

BRIEF DESCRIPTION OF THE DRAWINGS

FIG. 1 is a block diagram showing an example of an arrangement of an optical information readout apparatus which is provided with a control apparatus of a linear motor for driving a pickup according to the present invention;

FIGS. 2A and 2B are diagrams showing the arrangement of a linear motor, of which FIG. 2A is a top view and FIG. 2B is a side view;

DESCRIPTION OF THE PREFERRED EMBODIMENTS

Figure 2A:
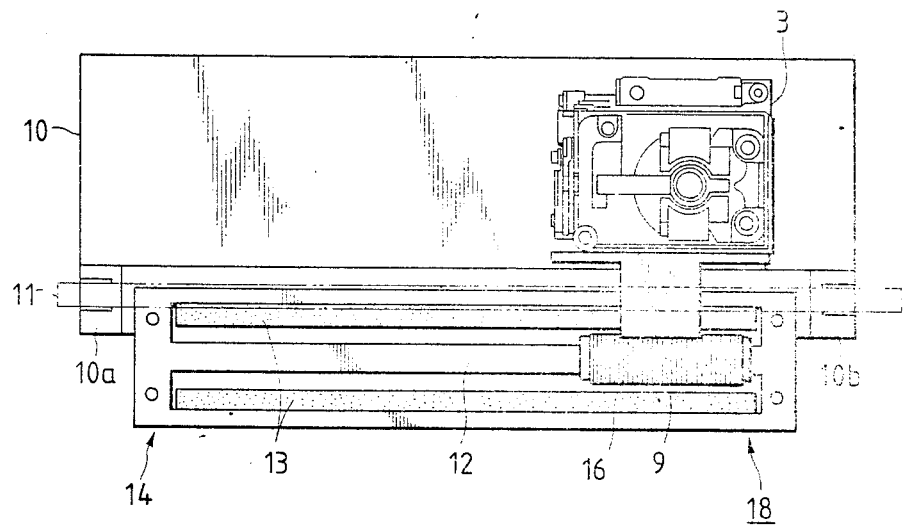

Preferred embodiments of the present invention will be described in detail as follows with reference to the drawings.

FIG. 1 is a diagram showing an example of the arrangement of an optical information readout apparatus, which is provided with a control apparatus for a linear motor for driving a pickup. In FIG. 1, an information storage disk 1 such as a video disk or audio disk is rotationally driven by a spindle motor 2. The information stored on the disk 1 is read by an optical pickup 3 moving in the radial direction of the disk. The RF readout signal which is output from the pickup 3 is amplified by an RF amplifier 4, then is demodulated in a demodulating circuit 5. The output of the demodulating circuit 5 is supplied directly to a data sampling circuit 6 while also being subjected to signal processing in a signal processing circuit 7 to thus provide a reproduced output. The data sampling circuit 6 samples data such as an address signal from the demodulated output, which data is supplied to a system controller 8.

The pickup 3 incorporates optical systems such as a laser light source, an objective lens, a photodetector for detecting an RF signal, a photodetector for a tracking servo, a focus actuator for driving the objective lens in the direction of its optical axis with respect to the information storage surface of the disk 1, and a tracking actuator for biasing a beam spot emitted from the pickup 3 in the radial direction with respect to the recorded track.

Figure 2B:
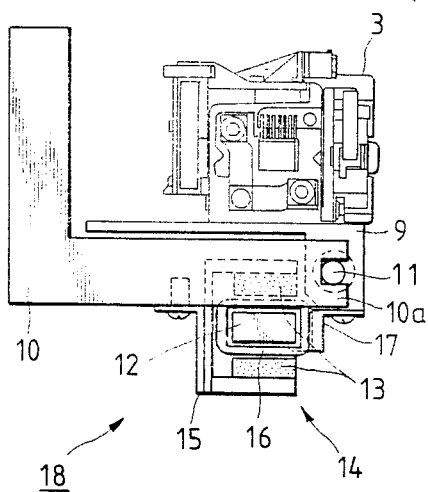

The pickup 3 is supported by a slider 9 as shown in FIGS. 2A and 2B. In FIGS. 2A and 2B, the slider 9 is movably connected to the guide rail 11, which is held at both ends thereof by supporters 10a and 10b of a base 10. A magnetic circuit 14 formed of a yoke 12 and a magnet 13 is mounted on the base by means of a mounting plate 15 to form a magnetic gap extending in the direction of motion of the slider 9. A moving coil 16 is positioned in the magnetic circuit on the opposite side of the pickup 3 with respect to the guide rail 11 mounted by means of a coil holder 17. The magnetic circuit 14 and the moving coil 16 form a moving-coil type linear motor 18 which drives the pickup 3 in the radial direction of the disk.

Again in FIG. 1, a tracking error signal producing circuit 19 produces a tracking error signal on the basis of the output of a photodetector for a tracking servo circuit. The tracking error signal is supplied to the tracking actuator within the pickup 3 through a loop switch 20 and an actuator drive circuit 21, thereby effecting tracking servo control with which the beam spot emitted from the pickup 3 is caused to follow the recorded track. Since the amplitude of the tracking error signal varies in sinusoidal fashion, when the beam spot crosses tracks, a track cross detecting circuit 22 implemented with a zero-crossing detector detects that the beam spot has crossed the recorded track. A detection pulse produced every time the beam spot crosses the recorded track is supplied to a track counter 23 where the number of tracks crossed is counted and accumulated. The output of the track counter 23 is supplied to a system controller 8. The track counter 23 is cleared by a reset signal supplied from the controller 8. Also, the low frequency component of the tracking error signal is supplied as a slider servo signal to a motor control circuit 24. The motor control circuit 24 controls a motor drive circuit 26 to produce a drive voltage in accordance with the signal level of the slider servo signal when the apparatus is in the normal playback mode, and a drive voltage of a polarity in accordance with the direction in which the pickup 3 moves when the apparatus is in the search operating mode. The drive voltage generated by a drive voltage generating circuit 25 is supplied to the motor drive circuit 26 for driving the linear motor 18.

The system controller 8, which is preferably implemented with a microcomputer, performs control of the motor control circuit 24, ON/OFF control of the loop switch 20 in accordance with the operating mode specified by an operation unit 27, while also calculating the number of tracks to a desired address at which the pickup is intended to arrive on the basis of the desired address which is input through the operation unit 27 and the present address which is supplied to the data sample circuit 6. The system controller also performs switching operation of the value of a feedback coefficient $K_1$ of a velocity feedback loop, which will be discussed later.

Figure 3:
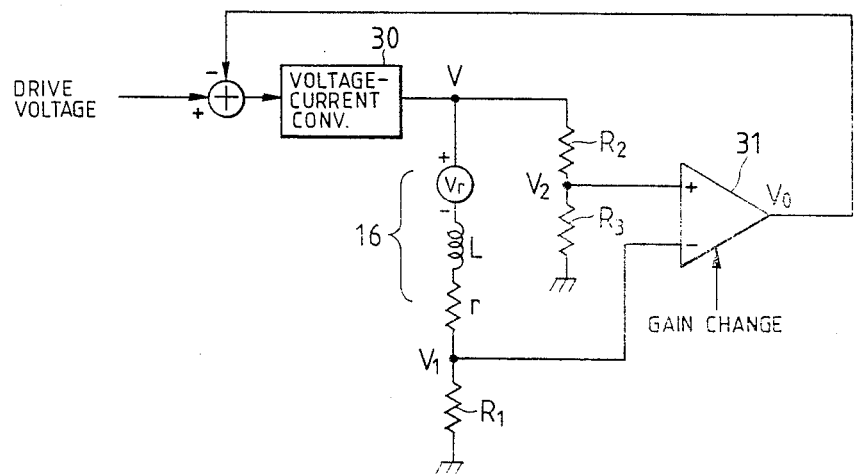
FIG. 3 is a circuit diagram showing a motor driving circuit in FIG. 1.

FIG. 3 is a schematic diagram showing the arrangement of the motor drive circuit 26. In FIG. 3, the drive voltage supplied from the drive voltage generating circuit 25 (shown in FIG. 1) is converted into a current by a voltage-current converter 30, and the current thereby produced is supplied to one end of the moving coil of the linear motor 18. The other end of the moving coil 16 is grounded through a resistor $R_1$. A series circuit of the moving coil 16 and the resistor $R_1$ and a series circuit of a resistor $R_2$ and a resistor $R_3$ are connected in parallel to form a resistor bridge. The voltage $V_1$ at the junction of the moving coil 16 and the resistor $R_1$ is supplied to the inverting input terminal of a differential amplifier 31, and the voltage $V_2$ at the junction point of the resistors $R_2$ and $R_3$ is supplied to the noninverting input terminal. If the moving coil 16 moves through the magnetic flux, then a back electromotive force $V_r$ will be generated across the moving coil 16 in proportion to the moving velocity thereof as shown in FIG. 3. Assuming that V is the voltage across the drive terminal of the moving coil 16, the amplitude of the AC component of the driving current is sufficiently low, and the inductance of the moving coil 16 can be neglected, then the following relations are established.

$$V_1 = R_1(V - V_r)/(R_1 + r), \quad V_2 = R_3V/(R_2 + R_3)$$

$$(R_1 + r)V_2 - V_1$$

If $r/R_1 = R_2/R_3$ is satisfied, then $V_0 = R_1V_r/(R_1 + r)$.

Thus, a voltage proportional to the velocity of the moving coil 16 is obtained as the output of the differential amplifier 31. The detected voltage is negatively fed back to the drive terminal of the moving coil 16, thereby forming a velocity feedback loop.

In this manner, detecting the velocity of the pickup 3 on the basis of the back electromotive force generated across the moving coil 16 can eliminate a detecting mechanism exclusively provided as well as simplify the structure of the velocity detecting circuitry. Thus, a compact size and low cost can be achieved by this simple structure.

Figure 10:
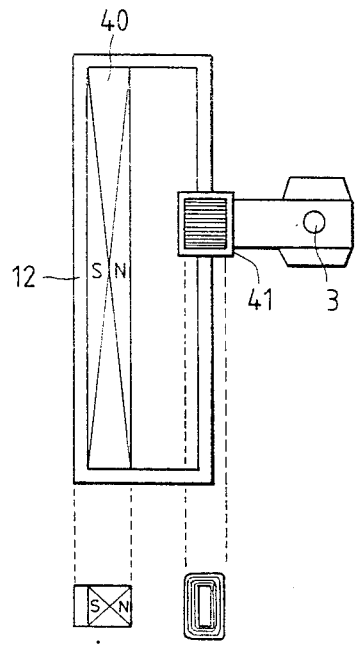
FIG. 10 is a diagram showing another way of detecting the moving velocity of the pickup.

Another way of detecting the velocity of the pickup 3 may be carried out utilizing the voltage induced across a velocity detection coil that moves through the magnetic field set up by the magnet 13, but not by detecting the back electromotive force. In such an arrangement as shown in FIG. 10, a velocity detection coil 41 in a unit assembly with the pickup is movably mounted on the yoke 12. A stationary permanent bar magnet 40 is provided on the yoke 12 so that an electromotive force is induced across the detection coil in proportion to the velocity thereof when the coil moves through the magnetic field set up by the bar magnet 40.

Figure 4:
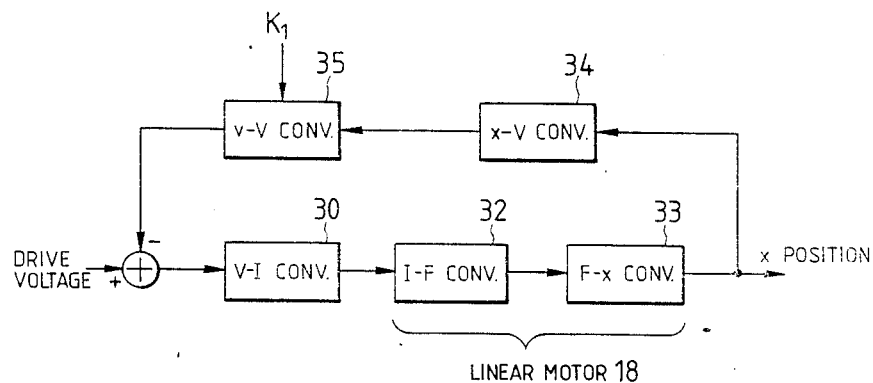
FIG. 4 is a diagram illustrating the principles of velocity feedback of the linear motor.

FIG. 4 illustrates the principles of the velocity feedback loop of a linear motor, in which an I-F (drive current to drive force) converter 32, F-x (drive force to position) converter 33, and x-v (position to velocity) converter 34 are equivalent to the linear motor 18, and a v-V (velocity to voltage) converter 35 is equivalent to the differential amplifier 31.

Characteristics of a linear motor are expressed as follows:

$$m(d^2x/dt^2)+\alpha(dx/dt)+\beta x=F(t)$$

$$F(t)=Bli(t) \qquad (1)$$

where x denotes a position, $\alpha$ a viscosity, $\beta$ a spring constant, F(t) a drive force, B a flux density, l an effective length of a coil passing through the magnetic flux, and i(t) a drive current.

A transfer function G is obtained as follows by simplifying Eq. (1).

$$G=A/[s^2+(1/Q)w_0s+w_0^2] \qquad (2)$$

where A is a DC gain, $\omega$ a resonant frequency, and Q a quality factor.

By applying to this transfer function velocity feedback whose feedback coefficient is $K_1$, there is obtained:

$$G=A/\{s^2+[(1/Q)w_0+AK_1]s+w_0^2\} \qquad (3)$$

Figure 5:
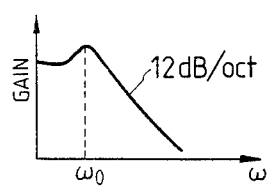
FIG. 5 is a diagram showing the frequency response of the linear motor when velocity feedback is not applied.
Figure 6:
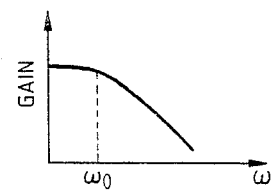
FIG. 6 is a diagram showing the frequency response of the linear motor when velocity feedback is applied.

The linear motor described by Eq. (3) can be regarded as a linear motor having a low Q. FIG. 5 and FIG. 6 show the frequency responses of the transfer function G in Eq. (2) where no velocity feedback is applied, and in Eq. (3) where velocity feedback is applied, respectively.

Figure 9:
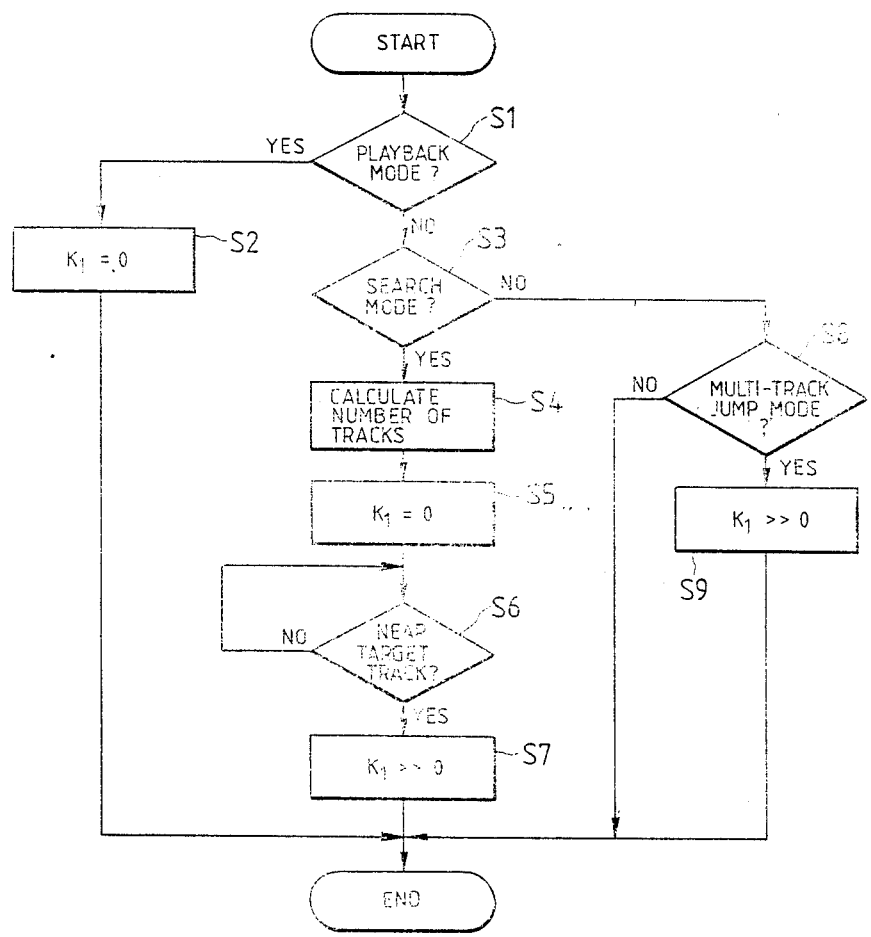
FIG. 9 is a flowchart showing the control procedure for changing the feedback coefficient $K_1$ as carried out by a processor of a system controller for respective operating modes.

The control procedure for changing the feedback coefficient $K_1$ of respective operating modes carried out by the processor of the system controller 8 in the control apparatus for a linear motor having such a feedback loop will be described with reference to the flowchart in FIG. 9.

During normal playback, a large value of the feedback coefficient $K_1$ causes a large amount of braking of the linear motor, requiring a large driving current to drive the linear motor and thus a large amount of power is consumed. Therefore, when the processor decides that the playback mode is specified (step S1), it sets the value of the feedback coefficient $K_1$ to 0 (or a small value) (step S2) so as not to apply velocity feedback.

Subsequently, when the processor decides that the search mode is specified (step S3), the processor calculates the number of tracks to the desired address on the basis of the desired address which is input through the operation unit 27 and the present address supplied from the data sample circuit 6 (step S4), while also setting the feedback coefficient $K_1$ to 0 (step S5). The feedback coefficient $K_1$ being set to 0 or velocity feedback being disabled, the pickup 3 can move at a high speed. Then, when the processor detects the track at a predetermined number of tracks preceding the desired track (step S6) by monitoring the accumulated value of the track counter 23, it sets a large value of $K_1$ (step S7). Thereby, movement of the linear motor is braked to cause the pickup 3 to quickly stop on the designated track.

Figure 7:
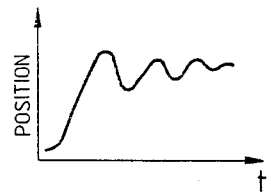
FIG. 7 is a diagram illustrating how the linear motor operates in a multi-track jump mode if velocity feedback is not applied.

That is, while the pickup is searching for the track, feedback is not applied until the pickup is sufficiently close to the desired track so that the pickup 3 can move at a high speed. When the pickup 3 nears the desired track, the linear motor is braked to quickly arrive at the target track. Thus, the high speed search operation can be effected. The aforementioned method in which the position at which $K_1$ should be changed is detected by counting the number of tracks is only exemplary and modifications may, of course, be made to the embodiment. In some apparatuses, a tracking velocity error is integrated and applied to the linear motor 18 during a multi-track jump operation, in which case the motion of the linear motor having a high Q will not settle promptly as shown in FIG. 7 if velocity feedback is not applied.

Figure 8:
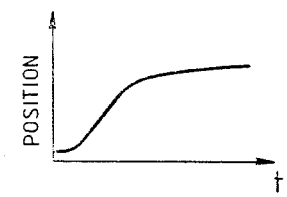
FIG. 8 is a diagram illustrating how the linear motor operates in the multi-track mode if velocity feedback is applied.

Thus, in the case where the processor decides that the apparatus is in the track jump mode (step S8), the processor sets $K_1$ to a large value (step S9) to apply velocity feedback for good settlement of the linear motor to the target position of the pickup and stable multi-track jumping as shown in FIG. 8.

Changing the value of the feedback coefficient $K_1$ for respective operating modes is effected by changing the gain of the differential amplifier 31 in FIG. 3.

The above embodiment has been described with reference to an apparatus for reading stored information from a disk, but the invention may also be applied to storage devices for storing information onto a disk.

As described above, according to the present invention, the apparatus is arranged in such a way that the voltage induced across the moving coil of the linear motor for driving the pickup in accordance with the moving velocity of the pickup is detected, the velocity feedback loop is provided to feed the detected voltage back to the terminals of the moving coil, and the linear motor is controlled by changing the feedback coefficient $K_1$ of the velocity feedback loop in accordance with the operating mode. Thus the linear motor operates with good stability to move the pickup to the desired position more rapidly and accurately.

What is claimed is:

1. A control apparatus for a linear motor for driving a pickup of an information storage/readout apparatus which stores, by means of a pickup, information onto a storage medium and/or reads the stored information from the storage medium, wherein said control apparatus comprises;
    a slider movable in a straight line while supporting said pickup;
    a magnetic circuit for forming a magnetic gap extending in the moving direction of the slider;
    a moving coil mounted on said slider so that at least a portion of the moving coil is located within said magnetic gap;
    detecting means for detecting a voltage induced across said moving coil in accordance with the velocity of said pickup;
    a velocity feedback loop for feeding back the voltage detected by said detecting means to a driving source of said coil; and
    means for changing the value of a feedback coefficient of said velocity feedback loop in accordance with an operating mode of said apparatus.

2. The control apparatus of claim 1, wherein said means for changing the value of said feedback coefficient sets said feedback coefficient to a zero or small value during a normal playback operating mode.

3. The control apparatus of claim 1, wherein, during a track search operation, said means for changing the value of said feedback coefficient sets said feedback coefficient initially to a zero or small value then changes said feedback coefficient to a large value within a predetermined distance of a target track.

4. The control apparatus of claim 1, wherein said means for changing the value of said feedback coefficient sets said feedback coefficient to a large value during a track jump operation.

* * * * *